United States Patent [19]

McKee et al.

[11] 4,393,164

[45] Jul. 12, 1983

[54] TRANSPARENT IMPACT-RESISTANT MOLDING MATERIAL

[75] Inventors: Graham E. McKee, Weinheim; Franz Haaf, Bad Durkheim; Juergen Hambrecht, Heidelberg; Klaus Benker, Neustadt; Rudolf Stephan, Ludwigshafen; Hans Breuer, Battenberg, all of Fed. Rep. of Germany

[73] Assignee: BASF Aktiengesellschaft, Ludwigshafen, Fed. Rep. of Germany

[21] Appl. No.: 362,407

[22] Filed: Mar. 26, 1982

[30] Foreign Application Priority Data

Apr. 4, 1981 [DE] Fed. Rep. of Germany ....... 3113627

[51] Int. Cl.³ .................... C08L 51/04; C08L 33/12; C08L 25/12
[52] U.S. Cl. ........................................ 525/83; 525/84; 524/504
[58] Field of Search ..................................... 525/84, 83

[56] References Cited

U.S. PATENT DOCUMENTS

| | | | |
|---|---|---|---|
| 3,029,223 | 4/1962 | Hibbard | 525/310 |
| 3,261,887 | 7/1966 | Mann | 525/83 |
| 3,922,321 | 11/1975 | Yusa et al. | 525/83 |
| 4,083,896 | 4/1978 | Moran et al. | 525/84 |
| 4,085,166 | 4/1978 | DiLeone et al. | 525/83 |
| 4,097,555 | 6/1978 | Moran | 525/310 |
| 4,115,478 | 9/1978 | Alsberg et al. | 525/84 |
| 4,228,256 | 10/1980 | Schmitt | 525/83 |

*Primary Examiner*—Carman J. Seccuro
*Attorney, Agent, or Firm*—Joseph D. Michaels

[57] ABSTRACT

Transparent, impact-resistant thermoplastic molding materials produced from a rigid methylmethacrylate polymer A, a rigid styrene-acrylonitrile polymer B and a flexible graft copolymer C, made from grafting an alkylmethacrylate and optionally styrene onto a rubber grafting base.

4 Claims, No Drawings

TRANSPARENT IMPACT-RESISTANT MOLDING MATERIAL

BACKGROUND OF THE INVENTION

1. Field of the Invention

This invention relates to transparent impact-resistant thermoplastic molding materials of a rigid methylmethacrylate polymerizate A, a rigid styrene-acrylonitrile polymer B and a flexible graft copolymer C of alkylmethacrylate and optionally styrene grafted onto a grafting base.

2. Description of the Prior Art

Transparent, impact resistant thermoplastic molding materials have been described in (1) German Published Application Ser. No. 15 20 631, (2) U.S. Pat. No. 4,097,555, (3) British Pat. No. 1,139,588, (4) German Application Ser. No. 20 45 742, and (5) German Published Application Ser. No. 28 28 517.

Reference (1) relates to transparent, impact resistant molding masses in which styrene, acrylonitrile and certain quantities of methylmethacrylate are polymerized in the presence of styrene-butadiene mixtures. The transparency of the products produced in accordance with this reference depend on the processing temperature, yellow very strongly and have an extremely upleasant odor which greatly impairs use as packaging. Another negative factor is a very pronounced seam marking.

Reference (2) relates to transparent, thermoplastic molding materials which contain a rigid component consisting of a terpolymer of styrene, acrylonitrile and methylmethacrylate and a flexible component consisting of a styrene/butadiene(SB) block copolymer which is grafted with the same composition of the termonomers from the rigid component and the refraction index of which is thus adjusted to the rigid component. These molding materials also show a pronounced yellow coloration and have an unpleasant odor. In most cases the transparency does not meet the requirements.

References 3, 4 and 5 relate to transparent molding materials which are based on a mixture of polymethylmethacrylate and styrene-acrylonitrile copolymers as rigid components and a flexible component based on polybutadiene or a SB-rubber which is grafted with styrene and acrylonitrile. In 3 and 4, the transparency of the molding materials is greatly dependent upon the processing temperature. In the molding materials of reference 5, the transparency is guaranteed even if high temperature differences are incurred during processing. All of the molding materials of references 3, 4 and 5 display a slight yellow coloration and an unpleasant odor which is damaging in certain areas of application. A purpose of this invention was to develop molding materials which do not have the above mentioned negative factors.

SUMMARY OF THE INVENTION

The purpose of the invention is met by a molding material having a transparency which is independent of the processing temperature. The material is water-clear, and does not show any yellow coloration even when produced with elevated processing temperatures, and is odor-free.

The invention relates to transparent, impact resistant molding materials consisting of a mixture of (A) 15 to 70 parts by weight of a methylmethacrylate polymer of 90 to 100 percent by weight of methylmethacrylate and 10 to 0 percent by weight of an alkylacrylate having from 1 carbon atoms to 8 carbon atoms in the alkyl radical, (B) 10 to 50 parts by weight of a styrene-acrylonitrile polymer containing 78 to 88 parts by weight styrene and 22 to 12 parts by weight acrylonitrile, (C) 20 to 50 parts by weight of a copolymerized graft polymer mixture obtained by grafting ($C_1$) 50 to 80 percent by weight relative to the copolymerized graft polymer mixture C of an elastomeric grafting base having a glass temperature below $-20°$ C. with ($C_2$) 20 to 50 percent by weight of the following components as a mixture or in sequence:

($C_{21}$) 40 to 100 parts by weight of one or more methacrylic acid esters of $C_1$-$C_8$-alkanols and ($C_{22}$) 0 to 60 parts by weight of styrene or an alkylstyrene having up to 12 carbon atoms, and (D) additives in an amount from 0 to 20 percent by weight relative to the total of components A, B, and C wherein the parts by weight of A, B, and C add up to 100 and the difference between the refraction index of component C and the refraction index of the mixture of components A, B and possibly D is less than 0.005.

DESCRIPTION OF THE PREFERRED EMBODIMENTS

A homopolymer of methylmethacrylate is used as the methylmethacrylate, rigid component A, for the molding material of this invention. However, copolymers of methylmethacrylate with up to 10 percent by weight of an alkylacrylate having from 1 carbon atom to 8 carbon atoms in the alkyl radical, such as methylacrylate and butylacrylate, may also be used. By incorporating alkylacrylates in the methylmethacrylate polymer, the flowability of component A and thus also that of the mixtures is improved. Methylmethacrylate polymer can be produced by bulk, solution or bead polymerization according to familiar methods. The methylmethacrylate polymer, preferably those having an alkylacrylate content of 0.5 to 7.0 percent by weight still have sufficient dimensional stability when exposed to heat. The homo- and/or copolymerizates used on a preferred basis have average weight values of the molecular weight, determined by the light scattering in chloroform in the range of 60,000 to 300,000.

The rigid component B of the molding material of use in this invention is a copolymer of 78 to 88 percent by weight of styrene and 22 to 12 percent by weight of acrylonitrile. Outside of the range of this composition, cloudy molded parts, showing seams, are obtained with processing temperatures above 240° C. The copolymers can be produced according to all familiar processes, for instance, by bulk, solution, suspension or emulsion polymerization. Preferably used are copolymerizates produced in solution. The polymers should have weight average molecular weights in the range of 60,000 to 300,000, determined by light scattering in dimethylformamide, and are preferably produced by the process described in British Pat. No. 1,472,195. Styreneacrylonitrile copolymers have a good flowability compared with component A. Corresponding with the amount of component B, this property is transferred to the molding material of this invention.

The flexible component C of the molding material of this invention is a graft copolymer using a rubber having a glass temperature below $-20°$ C. as the grafting base. The grafting base $C_1$ is produced in the commonly applied manner by emulsion polymerization. Following this, the grafting branch $C_{21}$ and optionally $C_{22}$ is grafted and spray dried in the same familiar manner. The particle size of the cross-linked flexible component C should be 0.2 microns or less.

The rubbers used must have elastomeric properties so that they cause an improvement of the impact resistance of the mixture according to this invention. A measure for this elastomer property is the glass temperature according to K. H. Illers and H. Breuer, Kolloid-Zeitschrift 176 [Kolloid Journal](1961), page 110. Useful as the elastomeric grafting base $C_1$ are copolymers of butadiene and/or isoprene with styrene or a styrene with up to 12 carbon atoms substituted in the α- position or preferably at the nucleous with one (or at the nucleous several) alkyl group(s), preferably methyl. Useful in a preferred embodiment as the elastomeric graft base $C_1$ are cross-linked copolymers of the following components: $C_{11}$—60 parts by weight to 90 parts by weight of butadiene or isoprene, and $C_{12}$—10 to 40 parts by weight of styrene or an alkyl styrene having up to 12 carbon atoms.

The grafting base $C_1$ is contained in component C in an amount from 50 to 80 percent by weight, preferably 55 to 70 percent by weight. The grafting branch $C_2$ represents 20 to 50 percent by weight, preferably 30 to 45 percent by weight, of the entire grafting rubber. Forty to 100 percent by weight of the grafting branch $C_2$ consists of one or more methacrylic acid esters of $C_1$-$C_8$-alkanols, component $C_{21}$. Preferably used as $C_{21}$ is methacrylate to which small quantities of additional acrylates, for instance, methyl-, ethyl-, propyl- or butylacrylate are added. The grafting branch, $C_2$, may contain up to 60 percent by weight of a vinyl aromatic monomer having up to 12 carbon atoms as component $C_{12}$. Alkyl styrenes of up to 12 carbon atoms which are alkyl substituted at the nucleous and styrene itself are preferably used for $C_{22}$. When using more than one monomer for the grafting branch, a shell-type structure may be desirable. The various shells may have different compositions. This is achieved by adding various monomers (monomer mixtures) at various points of the polymerization.

The molding material contains 15 to 70, preferably 30 to 60 parts by weight of component A, 10 to 50, preferably 10 to 40 parts by weight of component B, and 20 to 50, preferably 25 to 40 parts by weight of component C. The molding materials of this invention may contain up to 20 percent by weight relative to the mixture of A, B and C, of commonly used additives, D, which dissolve in a clear fashion in rigid components A and B. Such additives include- styrene/maleic anhydride copolymer, dyes, stabilizers, lubricants and known antistatic agents.

Components A, B, C and additives D are preferably mixed when in the molten state. As a rule, the components are processed at temperatures between 200° C. and 300° C. It is also possible to mix solutions or suspensions of the components and to subsequently remove the solvent or suspension agent.

The processing latitude of the thermoplastic transparent mixtures of this invention above 200° C. is not restricted by incompatibility phenomena. The mixtures can be processed between 200° C. and 300° C. without loss of transparency, without recognizable yellowing, and without a cumbersome odor development. Molded parts which are produced by injection molding do not show any seam markings and excel by their high transparency and high surface gloss. The mechanical properties correspond with those of highly impact resistant ABS formulations.

A prerequisite for the transparency of the molding materials of this invention is that the difference between the refraction index of the flexible component C and that of the mixture of the two rigid components A and B and additives D is less than 0.005. The refraction index of the mixture of the rigid components A and B is obtained from the linear combination of the refractory indices of the individual components and their weight shares. With a given refractory index of flexible component C, the refractory index of the rigid component is adjusted by a suitable choice of the ratio of A:B. Another significant prerequisite for the independence of the transparency from the processing temperature is the fact that the listed composition of component B is maintained.

Molded parts may be produced from the molding materials of this invention, primarily by injection or blow molding. The molding materials may also be pressed, colandered, extruded or vacuum formed. The molded parts may be used in all those areas where the tenacity of traditional transparent plastics is not sufficient, for instance, for rear lights in automobiles, transparent household appliances, toys, and coatings in combination with the most diverse materials.

The ratios and percentages in the examples and comparison tests are relative to the weight.

The breaking energy was measured in accordance with the Plastechon Test (DIN 53443), page 2, using 2 mm thick, round plates which were sprayed with material temperatures of 250° C. The refractory index $n_D^{25}$ was determined by use of an Abbe Refractometer using the method for the measurement of the refractory index on solid bodies (see Ullmann's Encyclopedia of Technical Chemistry, vol. 2/1, page 486, edited by W. Foerst; Urban & Schwarzenberg, Munich-Berlin 1961).

Polymer $A_1$, copolymer $B_1$, graft copolymers $C_1$ to $C_3$ (state of the art) and $C_4$ to $C_7$ (of this invention) which will be identified in greater detail below were used for the examples and the comparison tests:

$A_1$ Copolymer of methylmethacrylate and butylacrylate in a ratio of 96.0/4.0 ($n_D^{25}$=1.492, molecular weight (MW) 110,000).

$B_1$ Copolymer of styrene and acrylonitrile in a ratio of 80:20 ($n_D^{25}$=1.575, MW 250,000).

$C_1$ Graft copolymer of 36 percent methylmethacrylate, styrene and acrylonitrile (54:37:9) onto 64 percent butadiene-styrene (75:25) ($n_D^{25}$=1.538).

$C_2$ Graft polymer of 35 percent methylmethacrylate, styrene and acrylonitrile (58:37:5) onto 65 percent butadiene and styrene (72:28) ($n_D^{25}$=1.5403).

$C_3$ Graft copolymer of 18 percent methylmethacrylate and butylacrylate (95:5) on 22 percent styrene and acrylonitrile (90:10) on 60 percent butadiene and styrene (72:28) ($n_D^{25}$=1.5428).

$C_4$ Graft copolymer of 23 percent methylmethacrylate on 22 percent styrene and butylacrylate (90:10) on 55 percent butadiene and styrene (72:28) ($n_D^{25}$=1.5402).

$C_5$ Graft copolymer of 45 percent methylmethacrylate and styrene (52:48) on 55 percent butadiene and styrene (75:25) ($n_D^{25}$=1.5374).

$C_6$ Graft copolymer of 20 percent methylmethacrylate and ethylacrylate (98:2) on 30 percent styrene on 50 percent butadiene-styrene (76:24) ($n_D^{25}$=1.5380).

$C_7$ Graft copolymer of 40 percent methylmethacrylate and styrene (1:1) on 60 percent butadiene and styrene (78:22) ($n_D^{25} = 1.5398$).

The glass temperature of the grafting base of $C_{1-7}$ was in each case below $-20°$ C.

In comparison test 1 to 3 of the table, properties, of the molding materials according to the state of the art (German Published Application Ser. No. 2,828,517) are described.

Examples 1 through 4 correspond with the present invention. In all tests and examples, the difference between the refractory index of component C and the corresponding index of the mixture of components A and B was less than 0.005.

The composition of the mixture, the yellowness index according to ASTM D/1925, the breaking energy measured according to the Plastechon Test (DIN 53 443, page 2) and the odor are listed in the table. The odor was evaluated by five people using granulate samples. The granulate samples were stored in glass bolttles for one day. The samples of the comparison tests have a more unpleasant odor and a higher yellowness index than those of the examples produced in accordance with this invention.

TABLE

| Comparison Test (in accordance with the state of the art) | Polymer [pbw] | Plastechon Test KT = 250° C. | Yellowness Index | Odor |
|---|---|---|---|---|
| 1 | 28.6 $A_1$ | 8.7 | 6.80 | unpleasant |
|  | 35.4 $B_1$ |  |  |  |
|  | 36.0 $C_1$ |  |  |  |
| 2 | 26.9 $A_1$ | 2.0 | 7.05 | unpleasant |
|  | 37.1 $B_1$ |  |  |  |
|  | 36.0 $C_2$ |  |  |  |
| 3 | 24.4 $A_1$ | 7.8 | 9.80 | unpleasant |
|  | 39.6 $B_1$ |  |  |  |
|  | 36.0 $C_3$ |  |  |  |
| Example |  |  |  |  |
| 1 | 28.5 $A_1$ | 12.7 | 4.88 | essentially odorless |
|  | 35.5 $B_1$ |  |  |  |
|  | 36.0 $C_4$ |  |  |  |
| 2 | 29.0 $A_1$ | 5.9 | 2.72 | essentially odorless |
|  | 35.0 $B_1$ |  |  |  |
|  | 36.0 $C_5$ |  |  |  |
| 3 | 28.6 $A_1$ | 0 | 4.63 | essentially odorless |
|  | 35.4 $B_1$ |  |  |  |
|  | 36.0 $C_6$ |  |  |  |
| 4 | 27.2 $A_1$ | 7.7 | 2.97 | essentially odorless |
|  | 36.8 $B_1$ |  |  |  |
|  | 36.0 $C_7$ |  |  |  |

The embodiments of the invention in which an exclusive privilege or property is claimed are defined as follows:

1. Transparent, impact resistant molding material which can be processed above 200° C. without recognizable yellowing and odor development, consisting of a mixture of
    (A) 15 to 70 parts by weight of a methylmethacrylate polymer containing 90 to 100 percent by weight of a methylmethacrylate and 10 to 0 percent by weight of an alkylacrylate having 1 carbon atom to 8 carbon atoms in the alkyl radical,
    (B) 10 to 50 parts by weight of a styrene/acrylonitrile copolymer containing 78 to 88 parts by weight styrene and 22 to 12 parts by weight acrylonitrile,
    (C) 20 to 50 parts by weight of a copolymerized graft polymer mixture and
    (D) additives in an amount from 0 to 20 percent by weight relative to the total of components A, B and C wherein the parts by weight of A, B and C total 100 and where the difference between the refractory index of component C and the refractive index of the mixture of components A, B and D is less than 0.005,
wherein the copolymerized graft polymer mixture C is produced by grafting
    ($C_1$) 50 to 80 percent by weight relative to the copolymerized graft polymer C of a diene elastomeric grafting base having a glass temperature below $-20°$ C. with
    ($C_2$) 20 to 50 percent by weight consisting of of the following components as a mixture or in sequence:
        ($C_{21}$) 40 to 100 parts by weight of one or more methacrylates of $C_1$–$C_8$ alkanols and
        ($C_{22}$) 0 to 60 parts by weight of styrene or an alkylstyrene having up to 12 carbon atoms.

2. The molding materials of claim 1 wherein components A, B, C and D are mixed while molten.

3. The molding materials of claim 1 wherein the elastomeric graft base $C_1$ consists of a cross-linked copolymer of the following components:
    ($C_{11}$) 60 to 90 parts by weight of butadiene or isoprene and
    ($C_{12}$) 10 to 40 parts by weight of styrene or an alkylstyrene having up to 12 carbon atoms.

4. A molded part made from the molding material of any one of claims 1 through 3.

* * * * *